United States Patent
Lindoff et al.

(10) Patent No.: US 10,516,569 B2
(45) Date of Patent: *Dec. 24, 2019

(54) CONFIGURATION OF NETWORK NODES

(71) Applicant: Telefonaktiebolaget LM Ericsson (publ), Stockholm (SE)

(72) Inventors: Bengt Lindoff, Bjarred (SE); Leif Wilhelmsson, Dalby (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/106,295

(22) PCT Filed: Dec. 19, 2013

(86) PCT No.: PCT/EP2013/077376
§ 371 (c)(1),
(2) Date: Jun. 18, 2016

(87) PCT Pub. No.: WO2015/090396
PCT Pub. Date: Jun. 25, 2015

(65) Prior Publication Data
US 2016/0337177 A1 Nov. 17, 2016

(51) Int. Cl.
*H04L 12/24* (2006.01)
*H04W 16/14* (2009.01)
(Continued)

(52) U.S. Cl.
CPC ......... *H04L 41/0803* (2013.01); *H04W 16/14* (2013.01); *H04W 24/02* (2013.01);
(Continued)

(58) Field of Classification Search
CPC . H04W 16/14; H04W 24/02; H04W 72/0453; H04W 72/082; H04W 56/001;
(Continued)

(56) References Cited

U.S. PATENT DOCUMENTS 8,374,212 B2 * 2/2013 Charbit .................. H04B 1/715
375/132
9,288,742 B2 3/2016 Etemad et al.
(Continued)

FOREIGN PATENT DOCUMENTS

WO 2009031825 A2 3/2009
WO 2012026857 A1 3/2012
(Continued)

OTHER PUBLICATIONS

PCT International Search Report, dated Oct. 16, 2014, in connection with International Application No. PCT/EP2013/077376, all pages.
(Continued)

*Primary Examiner* — Redentor Pasia
(74) *Attorney, Agent, or Firm* — Leffler Intellectual Property Law, PLLC

(57) ABSTRACT

There is provided configuration of a secondary network node in a carrier aggregation enabled communications network The secondary network node supports radio transmission using a cellular radio access technology (RAT) for deployment as a network node serving a secondary serving cell associated with a primary serving cell in a carrier aggregation enabled communications network using the cellular RAT and a non-cellular RAT for deployment as a network node serving a non-cellular RAT hotspot using the non-cellular RAT. After receiving an indication from a cellular primary network node associated with the primary serving cell the secondary network node starts scanning an unlicensed frequency band for deployment of the network node. The secondary network node determines at least one frequency interval of the at least one unlicensed frequency band substantially free from transmitting interferers. Based on information received from the cellular primary network node the secondary network node deploys the network node using the cellular RAT or the non-cellular RAT by config- (Continued)

uring the secondary network node for transmission in one of the at least one frequency interval according to the configuration information.

28 Claims, 6 Drawing Sheets

(51) Int. Cl.

| | | |
|---|---|---|
| H04W 24/02 | (2009.01) | |
| H04W 72/04 | (2009.01) | |
| H04L 5/00 | (2006.01) | |
| H04L 27/00 | (2006.01) | |
| H04W 56/00 | (2009.01) | |
| H04W 72/08 | (2009.01) | |
| H04W 74/08 | (2009.01) | |
| H04W 84/12 | (2009.01) | |
| H04W 88/06 | (2009.01) | |
| H04W 16/18 | (2009.01) | |

(52) U.S. Cl.
CPC ..... *H04W 56/001* (2013.01); *H04W 72/0453* (2013.01); *H04W 72/082* (2013.01); *H04W 74/0816* (2013.01); *H04L 5/0048* (2013.01); *H04W 84/12* (2013.01); *H04W 88/06* (2013.01)

(58) Field of Classification Search
CPC . H04L 5/0037; H04L 5/0048; H04L 27/0006; H04L 41/0803
See application file for complete search history.

(56) References Cited

U.S. PATENT DOCUMENTS

| | | | |
|---|---|---|---|
| 9,788,320 B2 | 10/2017 | Cattoni et al. | |
| 2012/0250578 A1 | 10/2012 | Pani et al. | |
| 2012/0282942 A1 | 11/2012 | Uusitalo et al. | |
| 2013/0077554 A1* | 3/2013 | Gauvreau | H04W 72/0453 370/312 |
| 2013/0279376 A1 | 10/2013 | Ahmadi | |
| 2014/0043979 A1* | 2/2014 | Etemad | H04W 4/70 370/237 |
| 2014/0044105 A1 | 2/2014 | Bontu et al. | |
| 2015/0126207 A1* | 5/2015 | Li | H04W 16/14 455/452.1 |
| 2015/0131536 A1* | 5/2015 | Kaur | H04L 5/001 370/329 |
| 2015/0156635 A1 | 6/2015 | Liang et al. | |
| 2016/0301504 A1 | 10/2016 | Toskala et al. | |
| 2016/0337176 A1* | 11/2016 | Lindoff | H04W 16/14 |

FOREIGN PATENT DOCUMENTS

| | | |
|---|---|---|
| WO | 2012051157 A1 | 4/2012 |
| WO | 2012134567 A1 | 10/2012 |
| WO | 2012152298 A1 | 11/2012 |
| WO | 2013001333 A1 | 1/2013 |
| WO | 2013179095 A1 | 12/2013 |

OTHER PUBLICATIONS

PCT International Preliminary Report on Patentability, dated Jun. 21, 2016, in connection with International Application No. PCT/EP2013/077376, all pages.
Non-Final Office Action dated Jan. 5, 2018 in connection with U.S. Appl. No. 15/106,294, 26 pages.
Final Office Action dated Jun. 15, 2018 in connection with U.S. Appl. No. 15/106,294, 23 pages.
Non-Final Office Action dated Jan. 17, 2019 in connection with U.S. Appl. No. 15/106,294, 11 pages.
PCT International Search Report, dated Oct. 16, 2014, in connection with International Application No. PCT/EP2013/077388, all pages.
PCT Written Opinion, dated Oct. 16, 2014, in connection with International Application No. PCT/EP2013/077388, all pages.
Ian F. Akylidiz et al., A Survey on Spectrum Management in Cognitive Radio Networks, Cognitive Radio communications and Networks, IEEE Communications Magazine, Apr. 2008, pp. 40-48.
Beibei Wang et al., Advances in Cognitive Radio Networks: A Survey, IEEE Journal of Selected Topics in Signal Processing, vol. 5, No. 1, Feb. 2011, pp. 5-23.

* cited by examiner

CONFIGURATION OF NETWORK NODES

TECHNICAL FIELD

Embodiments presented herein relate to configuration of a network node, and particularly to methods, a primary network node, a secondary network node, computer programs, and a computer program product for configuration of a network node.

BACKGROUND

In communication networks, there is always a challenge to obtain good performance and capacity for a given communications protocol, its parameters and the physical environment in which the communication network is deployed.

In wireless communications networks there is currently a lot of available spectra in unlicensed frequency bands. These bands are currently widely used by Wi-Fi. The sharing of the spectrum in Wi-Fi is done by dividing the total bandwidth into a number of channels. In the 2.4 GHz frequency band the channels are typically around 20 MHz wide, and up to 13 channels are defined. These channels are partially overlapping, and thus will interfere with each other. Three non-overlapping channels may be used in the 2.4 GHz band. For the 5 GHz frequency band more channels are available as the available bandwidth is larger. With the development of IEEE 802.11n and IEEE 802.11ac, the bandwidth has been increased from 20 MHz to 40, 80, and even 160 MHz. Thus, in particular when wider bandwidths are used, the number of non-overlapping channels is still rather small.

In common deployments of Wi-Fi, the access points (APs) are allocated such that the used channels, as far as possible, are not overlapping. In practical deployments this may involve the distance between APs using the same channel to be maximized.

Carrier sense multiple access with collision avoidance (CSMA/CA) is used for channel access. In general terms, this means that the channel is sensed, and only if the channel is declared as Idle, a transmission is initiated. In case the channel is declared as Busy, the transmission is deferred until the channel is found Idle. When the coverage areas of several APs overlap, this means that transmission related to one AP might be deferred in case a transmission to another AP which is within range can be detected. Effectively this means that if several APs are within range, they will have to share the channel in time, and the throughput for the individual APs may be severely degraded.

The main principle behind so-called cognitive radio is that an un-licensed user may be able to use licensed spectrum in case no licensed user (i.e., a white space; in telecommunications, white spaces generally refer to frequencies allocated to a broadcasting service but not used locally) is operating at a certain area. In general terms, the unlicensed user senses a certain spectrum and if no licensed user is presently transmitting the unlicensed user is allowed to use that spectrum for communication. The sensing typically has to continue during the communication since if any licensed user starts to use the spectrum the unlicensed users typically need to terminate the communication. Hence cognitive radio application may have time-varying connections in the sense that different spectrum parts are used at different time.

The principles of sensing a spectrum and allocate a spectrum part to an unlicensed user when the spectrum is not used is known in the art. However, one issue concerns the fact that no considerations are made with respect to the fact that cellular communication networks, such as 3GPP (Third Generation Partnership) Long Term Evolution (LTE), have a variable bandwidth for determination of how much bandwidth one can allocate.

Cellular radio access technologies, such as 3GPP LTE communications may thus be used in unlicensed frequency bands, such as the industrial, scientific and medical (ISM) band. One approach is to use LTE on a best effort basis, when carrier aggregation is employed. Specifically, the unlicensed band is used for a secondary cell (SCell) to a Primary cell (PCell) that is operating in a licensed spectrum. In this way the connection to a served device may still be maintained via at least the PCell in case the SCell may be interfered by, say, Wi-Fi or Bluetooth.

Carrier Aggregation is known in the art and is defined from 3GPP Release 10. However, the prior art does neither address allocation approaches, nor possible interference scenarios (e.g., how to handle transmissions from Wi-Fi, or Bluetooth transmitters) that may occur once LTE is deployed in an unlicensed frequency band. Further, in case the ISM band is to be shared between, for instance, Wi-Fi and LTE, it may be beneficial that LTE does not impact the performance of Wi-Fi. Because Wi-Fi is based on CSMA/CA, an LTE signal may effectively force a Wi-Fi transmitter to defer its transmission as long as the LTE signal is present. Thus, the performance for Wi-Fi may be severely degraded.

Therefore, there is a need for a flexible channel allocation for allocating LTE in unlicensed frequency bands.

Hence, there is still a need for an improved channel allocation in unlicensed frequency bands.

SUMMARY

An object of embodiments herein is to provide improved channel allocation in unlicensed frequency bands.

The inventors of the enclosed embodiments have realized that it may be desirable to use unlicensed frequency bands, for instance the ISM band at 2.4 GHz and the bands at 5 GHz for cellular radio access technologies, such as 3GPP (Third Generation Partnership) Long Term Evolution (LTE) communications as well as non-cellular radio access technologies, such as Wi-Fi. The inventors of the enclosed embodiments have further realized that since these unlicensed frequency bands currently are occupied by transmissions of other radio transmitters, it is desirable that the cellular as well as non-cellular radio access technologies, if introduced in these unlicensed frequency bands should not degrade the performance of these other radio transmitters, or at least the impact on these other radio transmitters should be as small as possible.

A particular object is therefore to provide improved channel allocation in unlicensed frequency bands which keeps the impact on other radio transmitters as small as possible.

According to a first aspect there is presented a method for configuration of a secondary network node in a carrier aggregation enabled communications network. The secondary network node supports radio transmission using a cellular radio access technology (RAT) deployment as a network node serving a secondary serving cell associated with a primary serving cell in a carrier aggregation enabled communications network using the cellular RAT and a non-cellular RAT for deployment as a network node serving a non-cellular RAT hotspot using the non-cellular RAT. The method is performed by the secondary network node. The method comprises receiving an indication from a cellular primary network node associated with the primary serving cell to start scanning an unlicensed frequency band for deployment of said network node serving the secondary serving cell or as said network node serving the non-cellular RAT hotspot. The method comprises scanning at least one unlicensed frequency band to determine whether or not interference from transmitting interferers is present in the at least one unlicensed frequency band. The method comprises determining, based on the scanning, at least one frequency interval of the at least one unlicensed frequency band substantially free from the transmitting interferers. The method comprises transmitting information of the at least one frequency interval to the cellular primary network node. The method comprises receiving configuration information from the cellular primary network node, the configuration information indicating how to deploy said network node. The method comprises deploying said network node using the cellular RAT or the non-cellular RAT by configuring the secondary network node for transmission in one of the at least one frequency interval according to the configuration information.

Advantageously this provides improved channel allocation in unlicensed frequency bands.

Advantageously this provides improved channel allocation in unlicensed frequency bands whilst keeping the impact on other radio transmitters as small as possible.

Advantageously this provides a means for a first RAT, for instance an LTE SCell or a Wi-Fi local area (in conjunction with an LTE PCell in a licensed spectrum), to coexist with one or more other RATs in an unlicensed frequency band without, or at least minimum, degrading the performance for the other RATs. This is advantageously done by selecting the proper bandwidth for the LTE SCell or the Wi-Fi local area.

According to a second aspect there is presented a secondary network node for configuration of the secondary network node in a carrier aggregation enabled communications network. The secondary network node is arranged to support radio transmission using a cellular radio access technology (RAT) for deployment as a network node serving a secondary serving cell associated with a primary serving cell in a carrier aggregation enabled communications network using the cellular RAT and a non-cellular RAT for deployment as a network node serving a non-cellular RAT hotspot using the non-cellular RAT. The secondary network node comprises a processing unit. The processing unit is arranged to receive an indication from a cellular primary network node associated with the primary serving cell to start scanning an unlicensed frequency band for deployment of said network node serving the secondary serving cell or as said network node serving the non-cellular RAT hotspot. The processing unit is arranged to scan at least one unlicensed frequency band to determine whether or not interference from transmitting interferers is present in the at least one unlicensed frequency band. The processing unit is arranged to determine, based on the scanning, at least one frequency interval of the at least one unlicensed frequency band substantially free from the transmitting interferers. The processing unit is arranged to transmit information of the at least one frequency interval to the cellular primary network node. The processing unit is arranged to receive configuration information from the cellular primary network node, the configuration information indicating how to deploy said network node. The processing unit is arranged to deploy said network node using the cellular RAT or the non-cellular RAT by configuring the secondary network node for transmission in one of the at least one frequency interval according to the configuration information.

According to a third aspect there is presented a computer program for configuration of a secondary network node, the computer program comprising computer program code which, when run on a secondary network node, causes the secondary network node to perform a method according to the first aspect.

According to a fourth aspect there is presented a method for configuration of a secondary network node in a carrier aggregation enabled communications network. The secondary network node supports radio transmission using a cellular radio access technology (RAT) for deployment as a network node serving a secondary serving cell associated with a primary serving cell in a carrier aggregation enabled communications network using the cellular RAT and a non-cellular RAT for deployment as a network node serving a non-cellular RAT hotspot using the non-cellular RAT. The method is performed by a cellular primary network node associated with the primary serving cell. The method comprises determining a need for configuration of the secondary network node for the secondary serving cell or the non-cellular RAT hotspot in an unlicensed frequency band. The method comprises transmitting an indication for the secondary network node to start scanning the unlicensed frequency band for deployment of said network node serving the secondary serving cell or said network node serving the non-cellular RAT hotspot. The method comprises receiving, from the secondary network node, information of at least one frequency interval of the at least one unlicensed frequency band substantially free from transmitting interferers. The method comprises determining, based on the received information, configuration information for configuring the secondary network node for transmission in one of the at least one frequency interval using the cellular RAT or the non-cellular RAT. The method comprises transmitting the configuration information to the secondary network node.

According to a fifth aspect there is presented a cellular primary network node for configuration of a secondary network node in a carrier aggregation enabled communications network. The secondary network node is arranged to support radio transmission using a cellular radio access technology (RAT) for deployment as a network node serving a secondary serving cell associated with a primary serving cell in a carrier aggregation enabled communications network using the cellular RAT and a non-cellular RAT for deployment as a network node serving a non-cellular RAT hotspot using the non-cellular RAT. The cellular primary network node is arranged to be associated with the primary serving cell. The cellular primary network node comprises a processing unit. The processing unit is arranged to determine a need for configuration of the secondary network node for the secondary serving cell or the non-cellular RAT hotspot in an unlicensed frequency band. The processing unit is arranged to transmit an indication for the secondary network node to start scanning the unlicensed frequency band for deployment of said network node serving the secondary serving cell or said network node serving the non-cellular RAT hotspot. The processing unit is arranged to receive, from the secondary network node, information of at least one frequency interval of the at least one unlicensed frequency band substantially free from transmitting interferers. The processing unit is arranged to determine, based on the received information, configuration information for configuring the secondary network node for transmission in one of the at least one frequency interval using the cellular RAT or the non-cellular RAT. The processing unit is arranged to transmit the configuration information to the secondary network node.

According to a sixth aspect there is presented a computer program for configuration of a cellular primary access point, the computer program comprising computer program code which, when run on a cellular primary network node, causes the cellular primary network node to perform a method according to the fourth aspect.

According to a seventh aspect there is presented a computer program product comprising a computer program according to at least one of the first aspect and the fourth aspect and a computer readable means on which the computer program is stored.

According to an eight aspect there is presented an arrangement comprising a secondary network node according to the second aspect and a cellular primary network node according to the fifth aspect. The secondary network node may be a part of the cellular primary network node.

It is to be noted that any feature of the first, second, third, fourth, fifth, sixth, seventh and eight aspects may be applied to any other aspect, wherever appropriate. Likewise, any advantage of the first aspect may equally apply to the second, third, fourth, fifth, sixth, seventh, and/or eight aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
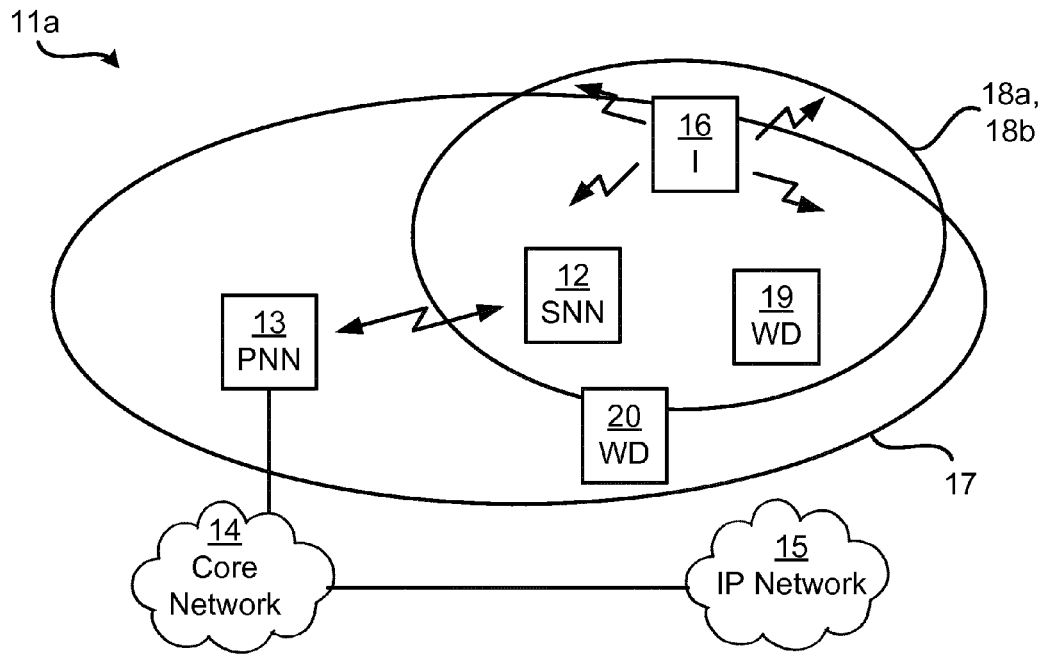
FIGS. 1a and 1b are schematic diagrams illustrating communication networks according to embodiments.
Figure 1B:
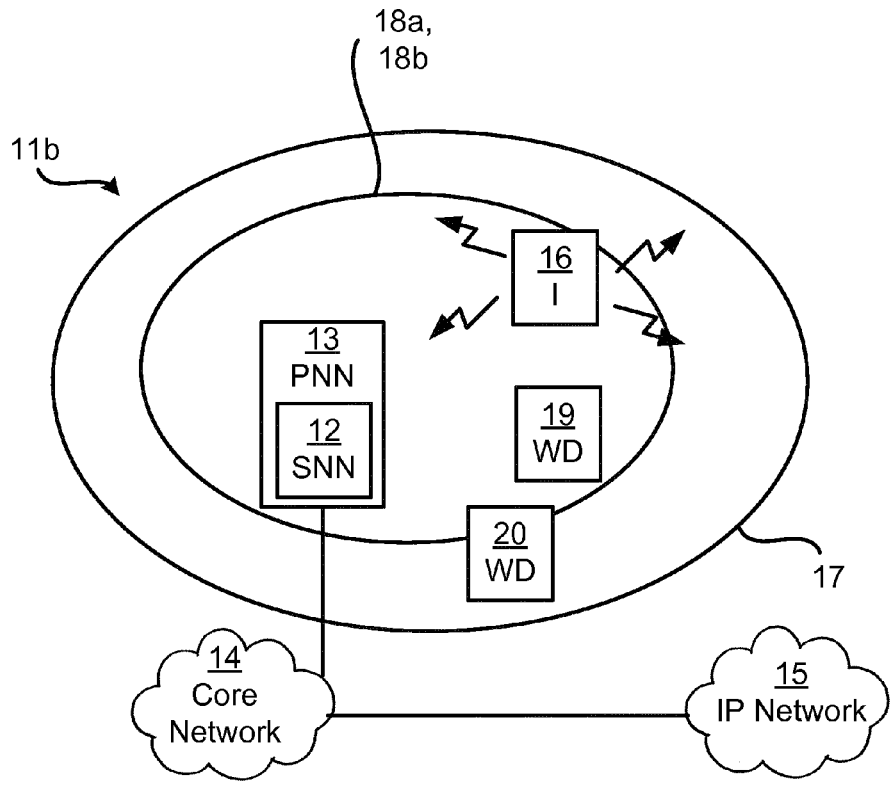

FIGS. 1a and 1b are schematic diagrams illustrating communication networks 11a, 11b where embodiments presented herein can be applied. The communication networks 11a, 11b are carrier aggregation enabled communications network. In general terms, carrier aggregation is used in LTE-Advanced in order to increase the bandwidth, and thereby increase the bitrate. The aggregation is based on carriers defined in Release 8 and Release 9 to keep backward compatibility with R8 and R9 compatible legacy wireless devices 20. Carrier aggregation can be used for both frequency-division duplexing (FDD) and time-division duplexing (TDD).

The communications networks 11a, 11b comprise a secondary network node 12. The secondary network node 12 may be a Node B or an Evolved Node B. The secondary network node 12 supports radio transmission using a cellular radio access technology (RAT), and a non-cellular RAT for deployment of either a secondary serving cell (SCell) 18a using the cellular RAT or a non-cellular RAT hotspot 18b using the non-cellular RAT. The secondary network node 12 may thus provide network coverage to a CA capable wireless device 19 in at least one SCell 18a and/or to a carrier aggregation capable wireless device 19 or a legacy wireless device 20 in at least one non-cellular RAT hotspot 18b.

The communications networks 11a, 11b further comprise a primary network node 13. The primary network node 13 is a cellular primary network node. The cellular primary network node 13 may be a Radio Base Station, Node B or an Evolved Node B. The cellular primary network node 13 provides network coverage to the wireless device 19 as well as the legacy wireless device 20 in a primary serving cell (PCell) 17. The SCell 18a is a secondary serving cell associated with the PCell 17 for the wireless device 19.

Hence it is assumed that the secondary network node 12 12 supports both configuration for cellular transmission in the SCell 18a and as an autonomously operated (but controlled from the network node 13) network node covering a non-cellular RAT hotspot 18b.

An interferer (I) 16 is also present in the communication networks 11a, 11b. The interferer 16 may be a radio transmitter transmitting in a frequency band, such as an unlicensed frequency band.

An arrangement may comprise a secondary network node 12 and a cellular primary network node 13. In the communication networks 11a the cellular primary network node 13 and the secondary network node 12 are provided as separated devices. In the communication networks 11b the cellular primary network node 13 comprises the secondary network node 12. The secondary network node 12 may thus be a part of the cellular primary network node 13.

The embodiments disclosed herein are based on configuring the secondary network node 12, for example in an LTE Carrier Aggregation (CA) scenario, assuming an SCell 18a or a non-cellular RAT hotspot 18b is deployed in an unlicensed spectrum, such as the ISM band. The embodiments for example address the coexistence with other RATs, such as Wi-Fi/WLAN (wireless local area network), than the one used by the PCell, by making use of the fact that the bandwidth of the SCell 18a or the non-cellular RAT hotspot 18b can be adjusted. Specifically, after estimating where there are interfering signals, the largest consecutive frequency range with non (or low)-interfering signals may be identified and then the bandwidth of the signal in the SCell 18a or the non-cellular RAT hotspot 18b may be chosen such that it will reduce the likelihood of interference to other RATs as well as reducing the likelihood to be interfered by the other RATs. The embodiments disclosed herein particularly relate to configuration of a secondary network node 12. In order to obtain configuration of the secondary network node 12 there is provided a secondary network node, a method performed by the secondary network node, a computer program comprising code, for example in the form of a computer program product, that when run on the secondary network node causes the secondary network node to perform the method.

In order to obtain configuration of a secondary network node 12 there is further provided a cellular primary network node 13, a method performed by the cellular primary network node 13, a computer program comprising code, for example in the form of a computer program product, that when run on the cellular primary network node 13, causes the cellular primary network node 13 to perform the method.

Figure 2A:
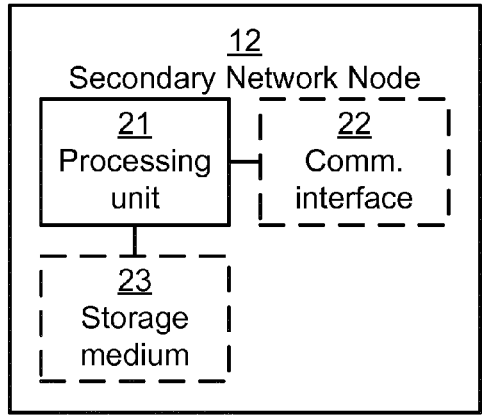
FIG. 2a is a schematic diagram showing functional modules of a secondary network node according to an embodiment.

FIG. 2a schematically illustrates, in terms of a number of functional modules, the components of a secondary network node 12 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31 (as in FIG. 4), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The secondary network node 12 may further comprise a communications interface 22 for communications with a cellular primary network node 13, a wireless device 19, and (optionally) a legacy wireless device 20. As such the communications interface 22 may comprise one or more transmitters and receivers, comprising analogue and digital components and a suitable number of antennas for radio communications and/or interfaces for wired communication. The processing unit 21 controls the general operation of the secondary network node 12 e.g. by sending data and control signals to the communications interface 22 and the storage medium 23, by receiving data and reports from the communications interface 22, and by retrieving data and instructions from the storage medium 23. Other components, as well as the related functionality, of the secondary network node 12 are omitted in order not to obscure the concepts presented herein.

Figure 2B:
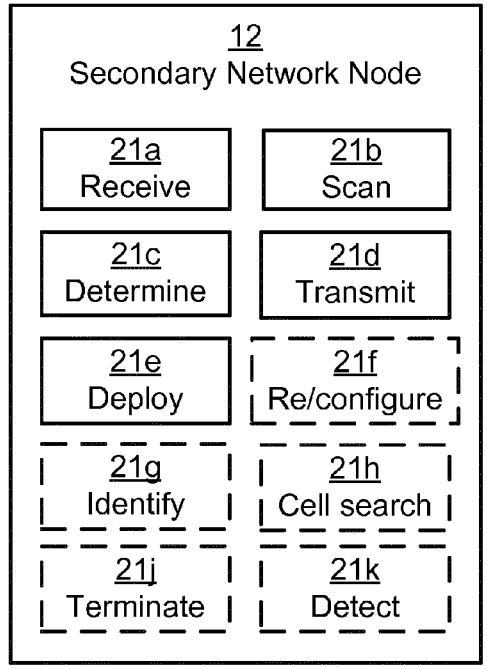
FIG. 2b is a schematic diagram showing functional units of a secondary network node according to an embodiment.

FIG. 2b schematically illustrates, in terms of a number of functional units, the components of a secondary network node 12 according to an embodiment. The secondary network node 12 of FIG. 2b comprises a number of functional units; a receive unit 21a, a scan unit 21b, a determine unit 21c, a transmit unit 21d, and a configure unit 21e. The secondary network node 12 of FIG. 2b may further comprises a number of optional functional units, such as any of a identify 21f, a cell search unit 21g, a reconfigure unit 21h, a terminate unit 21j, and a detect unit 21k. The functionality of each functional unit 21a-k will be further disclosed below in the context of which the functional units may be used. In general terms, each functional unit 21a-k may be implemented in hardware or in software. The processing unit 21 may thus be arranged to from the storage medium 23 fetch instructions as provided by a functional unit 21a-k and to execute these instructions, thereby performing any steps as will be disclosed hereinafter.

Figure 3A:
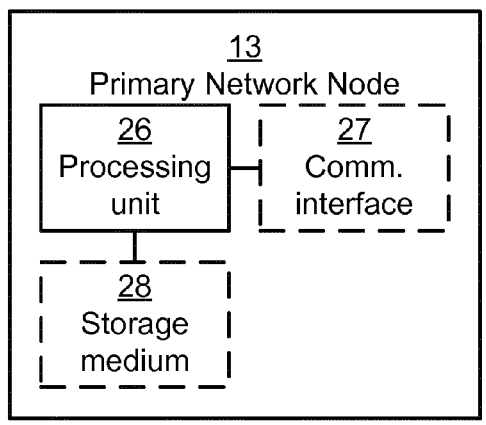
FIG. 3a is a schematic diagram showing functional modules of a cellular primary network node according to an embodiment.

FIG. 3a schematically illustrates, in terms of a number of functional modules, the components of a cellular primary network node 13 according to an embodiment. A processing unit 26 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31 (as in FIG. 4), e.g. in the form of a storage medium 28. Thus the processing unit 26 is thereby arranged to execute methods as herein disclosed. The storage medium 28 may also comprise persistent storage, which, for example, can be any single one or combination of magnetic memory, optical memory, solid state memory or even remotely mounted memory. The cellular primary network node 13 may further comprise a communications interface 27 for communications with a secondary network node 12, a wireless device 19, a legacy wireless device 20, and a core network 14. As such the communications interface 27 may comprise one or more transmitters and receivers, comprising analogue and digital components and a suitable number of antennas for radio communications and interfaces for wired communication. The processing unit 26 controls the general operation of the cellular primary network node 13 e.g. by sending data and control signals to the communications interface 27 and the storage medium 28, by receiving data and reports from the communications interface 27, and by retrieving data and instructions from the storage medium 28. Other components, as well as the related functionality, of the cellular primary network node 13 are omitted in order not to obscure the concepts presented herein.

Figure 3B:
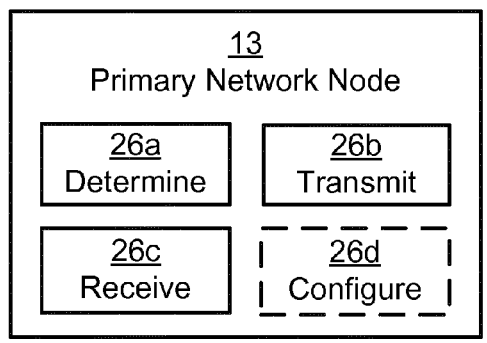
FIG. 3b is a schematic diagram showing functional units of a cellular primary network node according to an embodiment.

FIG. 3b schematically illustrates, in terms of a number of functional units, the components of a cellular primary network node 13 according to an embodiment. The cellular primary network node 13 of FIG. 2b comprises a number of functional units; a determine unit 26a, a transmit unit 26b, and a receive unit 26c. The cellular primary network node 13 of FIG. 2b may further comprises a number of optional functional units, such as a configure unit 26d. The functionality of each functional unit 26a-d will be further disclosed below in the context of which the functional units may be used. In general terms, each functional unit 26a-d may be implemented in hardware or in software. The processing unit 25 may thus be arranged to from the storage medium 28 fetch instructions as provided by a functional unit 26a-d and to execute these instructions, thereby performing any steps as will be disclosed hereinafter.

Figure 4:
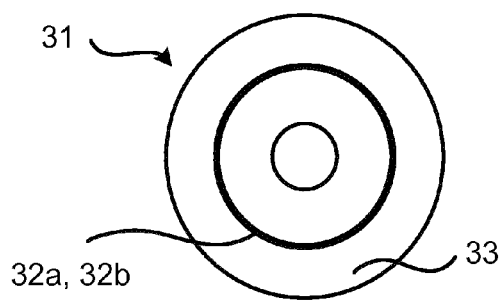
FIG. 4 shows one example of a computer program product comprising computer readable means according to an embodiment.
Figure 5A:
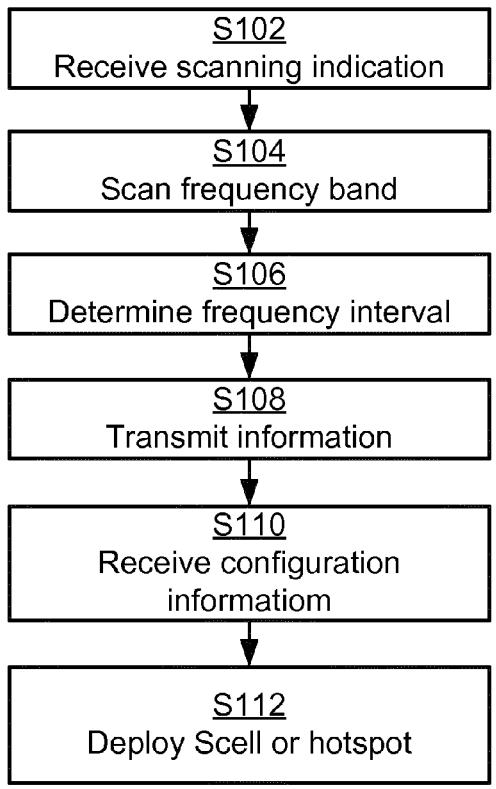
FIGS. 5a, 5b, 6a, and 6b are flowcharts of methods according to embodiments.
Figure 6B:
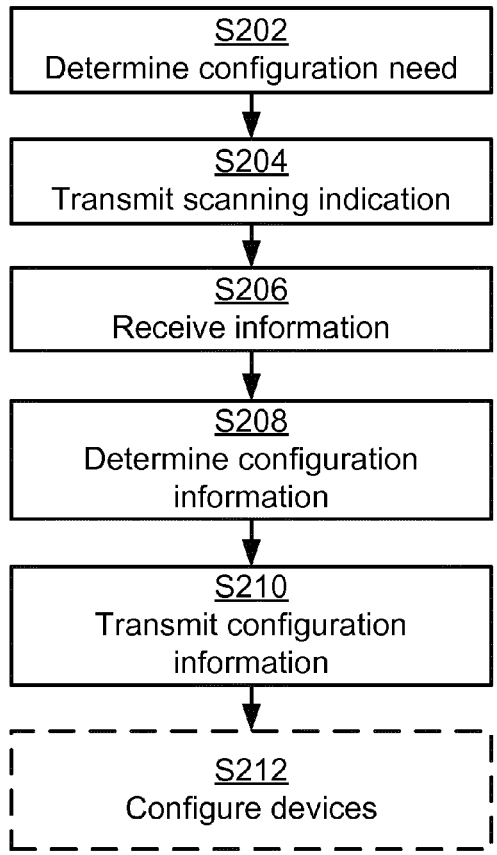
Figure 6A:
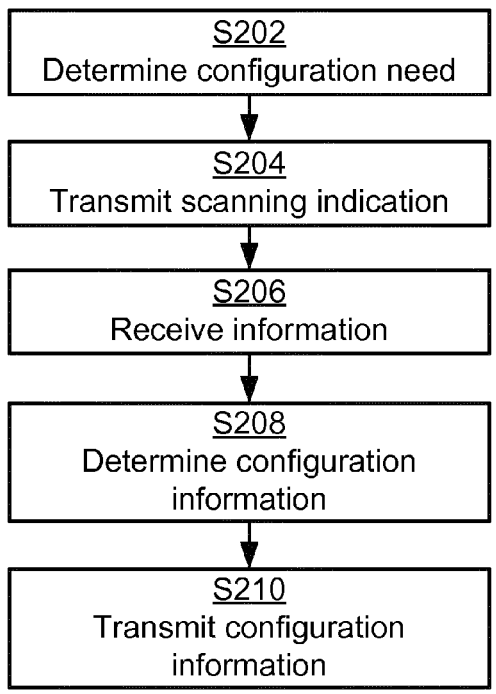
Figure 5B:
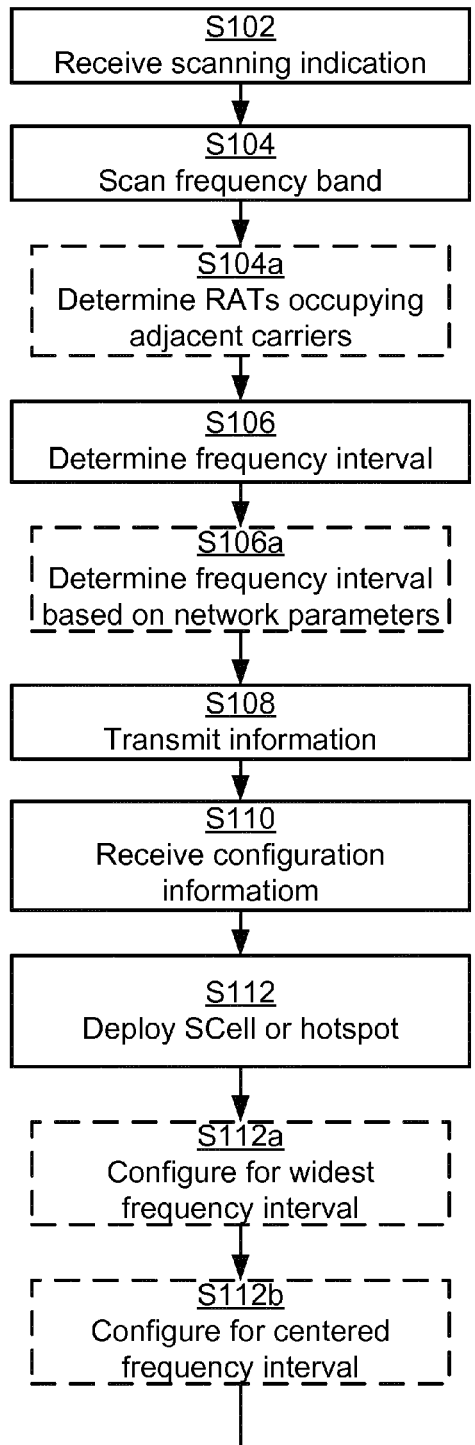
Figure 5B:
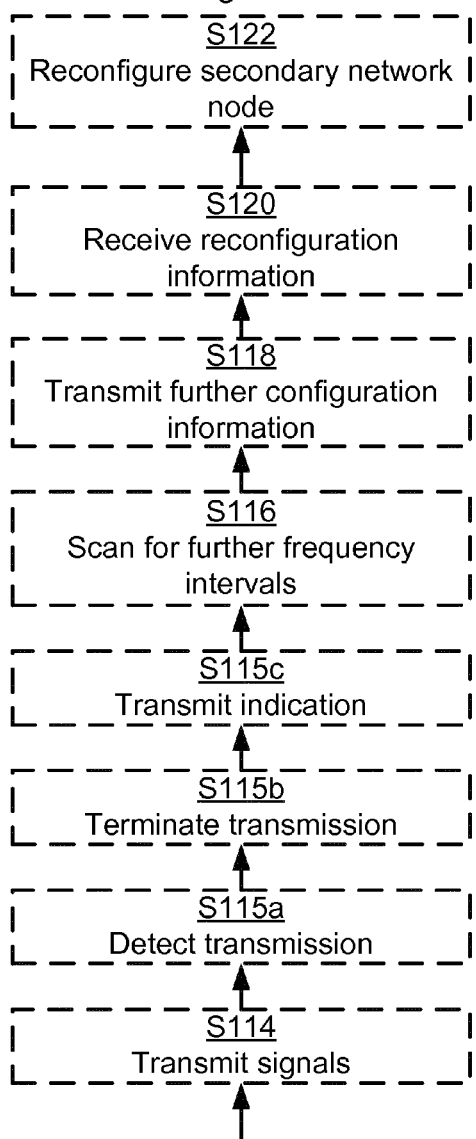

FIGS. 5a and 5b are flow charts illustrating embodiments of methods for configuration of a secondary network node as performed by the secondary network node 12. FIGS. 6a and 6b are flow chart illustrating embodiments of methods for configuration of a secondary network node as performed by the cellular primary network node 13. The methods are advantageously provided as computer programs 32a, 32b. FIG. 4 shows one example of a computer program product 31 comprising computer readable means 33. On this computer readable means 33, computer programs 32a, 32b can be stored, which computer program 32a can cause the processing unit 21 and thereto operatively coupled entities and devices, such as the communications interface 22 and the storage medium 23 to execute methods according to embodiments described herein, and which computer program 32b can cause the processing unit 26 and thereto operatively coupled entities and devices, such as the communications interface 27 and the storage medium 28 to execute methods according to embodiments described herein. The computer programs 32a, 32b and/or computer program product 31 may thus provide means for performing any steps as herein disclosed.

In the example of FIG. 4, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer programs 32a, 32b are here schematically shown as a track on the depicted optical disk, the computer programs 32a, 32b can be stored in any way which is suitable for the computer program product 31.

Reference is now made to FIG. 5a illustrating a method for configuration of a secondary network node 12 according to an embodiment as performed by the secondary network node 12. The secondary network node 12 is arranged to support radio transmission using a cellular radio access technology (RAT) for deployment as a network node serving a secondary serving cell (SCell) 18a using the cellular RAT and a non-cellular RAT for deployment as a network node serving a non-cellular RAT hotspot 18b using the non-cellular RAT. The SCell 18a is associated with a primary serving cell (PCell) 17 in a carrier aggregation enabled communications network.

The processing unit 21 of the secondary network node 12 is arranged to, in a step S102, receive an indication from a cellular primary network node 13 to start scanning an unlicensed frequency band for deployment of the SCell 18a or the non-cellular RAT hotspot 18b. The cellular primary network node 13 is associated with the PCell 17. The indication may have been transmitted from the cellular primary network node 13 as in step S204, see FIG. 6a below.

In response to this indication the secondary network node 12 scans the unlicensed frequency band. Hence the processing unit 21 of the secondary network node 12 is arranged to, in a step S104, scan at least one unlicensed frequency band. The processing unit 21 of the secondary network node 12 is thereby arranged to determine whether or not interference from transmitting interferers 16 is present in the at least one unlicensed frequency band.

Figure 7:
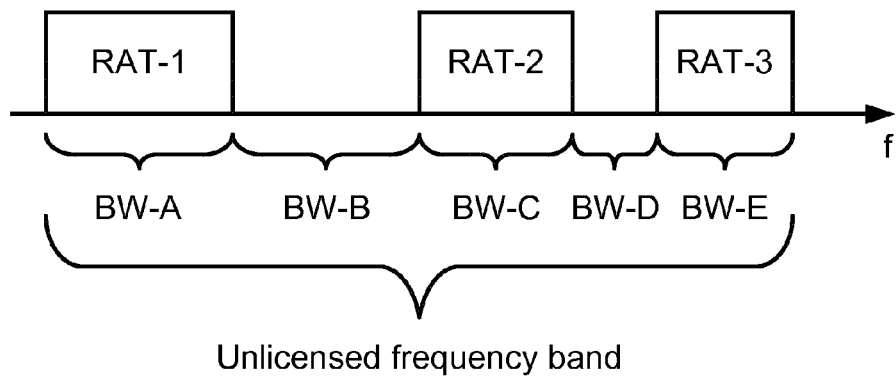
FIGS. 7, 8a, 8b, 9a, and 9b schematically illustrate frequency allocation according to embodiments.

The secondary network node 12 then, based on the result of the scanning, determines a frequency interval band in the unlicensed frequency band, which frequency interval band is free from transmitting interferers 16. The processing unit 21 of the secondary network node 12 is thus arranged to, in a step S106, determine, based on the scanning, at least one frequency interval of the at least one unlicensed frequency band substantially free from the transmitting interferers 16. In FIG. 7 RAT-1, RAT-2, and RAT-3 represent examples of transmitting interferers 16. In FIG. 7 the frequency intervals free from the transmitting interferers 16 thus are BW-B and BW-D.

The secondary network node 12 then, based on the determined frequency interval, transmits information to the cellular primary network node 13. Examples of this information will be provided below. Particularly, the processing unit 21 of the secondary network node 12 is arranged to, in a step S108, transmit information of the at least one frequency interval to the cellular primary network node 13. This information may be received by the cellular primary network node 13 as in step S206, see FIG. 6a below.

The secondary network node 12 then deploys the SCell 18a or the non-cellular RAT hotspot 18b based on configuration information received from the cellular primary network node 13. Particularly, the processing unit 21 of the secondary network node 12 is arranged to, in a step S110, receive configuration information from the cellular network node, where the configuration information indicates whether to deploy the SCell 18a or the non-cellular RAT hotspot 18b. This configuration information may be transmitted by the cellular primary network node 13 as in step S208, see FIG. 6a below.

The SCell 18a or the non-cellular RAT hotspot 18b may then be deployed by the secondary network node 12. The processing unit 21 of the secondary network node 12 is thus arranged to, in a step S112, deploy the network node using the cellular RAT or the using the non-cellular RAT by configuring the secondary network node 12 for transmission in one of the at least one frequency interval according to the configuration information.

The secondary network node 12 may thusly be configured.

Reference is now made to FIG. 6a illustrating a method for configuration of a cellular access point (AP) 12 according to an embodiment as performed by the cellular primary network node 13. The secondary network node 12 is arranged to support radio transmission using a cellular radio access technology (RAT) for deployment as a network node serving a secondary serving cell (SCell) 18a using the cellular RAT and a non-cellular RAT for deployment as a network node serving a non-cellular RAT hotspot 18b using the non-cellular RAT. The SCell 18a is associated with a primary serving cell (PCell) 17 in a carrier aggregation enabled communications network. The cellular primary network node 13 is associated with the PCell 17.

The cellular primary network node 13 first determines a need for configuration of the secondary network node 12. The processing unit 26 of the cellular primary network node 13 is thus arranged to, in a step S202, determine a need for configuration of the secondary network node 12 for the SCell 18a or the non-cellular RAT hotspot 18b in an unlicensed frequency band. The need may, for example, relate to resource sharing and/or allocation, spectrum sharing and/or allocation, carrier aggregation, etc.

Once the need has been determined, an indication is transmitted to the secondary network node 12. The processing unit 26 of the cellular primary network node 13 is arranged to, in a step S204, transmit an indication for the secondary network node 12 to start scanning the unlicensed frequency band for deployment of the network node serving the SCell 18a or the non-cellular RAT hotspot 18b. This indication may be received by the secondary network node 12 as in step S102 above.

The secondary network node 12 may then perform steps S104, S106, and S108 as disclosed above. The processing unit 26 of the cellular primary network node 13 is therefore arranged to, in a step S206, receive, from the secondary network node 12, information of at least one frequency interval of the at least one unlicensed frequency band substantially free from transmitting interferers 16.

The cellular primary network node 13 then determines whether the SCell 18a or the non-cellular RAT hotspot 18b is to be deployed in the unlicensed frequency band, or if neither the SCell 18a nor the non-cellular RAT hotspot 18b is to be deployed. If the decision is to enable an SCell 18a or a non-cellular RAT hotspot 18b, the cellular primary network node 13 sends configuration parameters. The cellular primary network node 13 thus, based on the received information determines configuration information. The processing unit 26 of the cellular primary network node 13 is arranged to, in a step S208, determine, based on the received information, configuration information for configuring the secondary network node 12 for transmission in one of the at least one frequency interval using the cellular RAT or the non-cellular RAT.

The determined configuration information is then communicated to the secondary network node 12. The processing unit 26 of the cellular primary network node 13 is thus arranged to, in a step S210, transmit the configuration information to the secondary network node 12. This configuration information is received by the secondary network node 12 as in step S110, see FIG. 6a.

The cellular primary network node 13 may thusly configure the secondary network node 12.

Embodiments relating to further details of configuration of the secondary network node 12 will now be disclosed. In the following, deploying a secondary serving cell is to be understood as being short for deploying a network node serving a secondary serving cell; and deploying a non-cellular RAT hotspot is to be understood as being short for deploying a network node serving a non-cellular RAT hotspot.

The cellular RAT may be a Long Term Evolution (LTE) compliant RAT. The non-cellular RAT may be a wireless local area network (WLAN) compliant RAT and/or an IEEE 802.11 compliant RAT.

The configuration information may comprise bandwidth configuration information, carrier frequency configuration information, radio channel number information, and/or transmission power configuration information.

The unlicensed frequency band may be an Industrial, Science, Medical, ISM, radio band. Particularly, the at least one unlicensed frequency band may be at least one of a 900 MHz frequency band, 2.4 GHz frequency band, a 5 GHz frequency band, a 24 GHz or a 60 GHz band. The unlicensed frequency band may further be defined by other unlicensed non-ISM frequency bands.

There may be different ways for the cellular primary network node 13 to determine whether the SCell 18a or the non-cellular RAT hotspot 18b is to be deployed in the unlicensed frequency band, as in step S208.

According to a first example the decision is based on the cell load of the cellular primary network node 13, such as the load and current service usage for wireless devices 19, 20 served by the PCell 17. Thus the configuration information may be based on a current cell load of the cellular primary network node 13.

According to a second example the decision is based on service requirements of wireless devices 19, 20 served by the PCell 17. For instance, if some wireless devices 19, 20 requires high downlink throughput the cellular primary network node 13 may decide to configure an LTE SCell 18a. However if many wireless devices 19, 20 are in active mode with respect to the cellular primary network node 13, but most using services such as voice over the Internet protocol (VoIP) applications (or background services, such as email etc. or chatty low throughput application, such as social media updates etc.), it may be better to configure a WLAN AP (i.e., a non-cellular RAT hotspot 18b) and order a (hard) handover of a subset of the wireless devices 19, 20 to the configured secondary network node 12, thus functioning as a WLAN Access Point. Hence, the configuration information may be based on at least one of service requirements, quality of service requirements, and throughput requirements of wireless devices operatively connected to the cellular primary network node 13.

According to a third example the decision (and hence the configuration information) is based on a bandwidth of the at least one frequency interval In more detail, an interference scenario in the unlicensed frequency band may be used for the decision. For instance, if only a narrow bandwidth is free (such as smaller than the WLAN bandwidth of 20 MHz) an LTE SCell may be configured with an smaller LTE bandwidth (e.g., 1.4, 3, 5, 10, 15 MHz). On the other hand, if adjacent interferers 16 on nearby carriers are WLAN, it may be preferable to configure a WLAN AP, since the intra-system coexistence procedures may be better than inter-system coexistence procedures.

Reference is now made to FIGS. 5b and 6b illustrating methods for configuration of a cellular access point according to further embodiments.

There may be different ways for the secondary network node 12 to scan the at least one unlicensed frequency band (as in step S104). The scanning in step S104 may comprise at least one of performing a power scan in the at least one unlicensed frequency band, and performing a cell search in the at least one unlicensed frequency band. For example, the scanning may comprise identifying RATs of adjacent carriers. Hence, according to an embodiment the processing unit 21 is arranged to, in an optional step S104a, determine what RATs are occupying carriers adjacent to the at least one frequency interval.

There may be different ways to determine in which one of the at least one frequency interval the SCell 18a or the non-cellular RAT hotspot 18b is to be deployed. Different embodiments relating thereto will now be described in turn.

For example, the frequency interval may be determined based on network parameters. According to one embodiment the processing unit 21 of the secondary network node 12 is thus arranged to, in an optional step S106a, determine the one of the at least one frequency interval based on at least one of ACLR, requirements, ACS, requirements, bandwidth requirements, and throughput requirements for the SCell 18a or the non-cellular RAT hotspot 18b.

For example, the frequency interval may be determined based on signal strength parameters. According to another embodiment the processing unit 21 of the secondary network node 12 is thus arranged to determine the at least one frequency interval by identifying a frequency range where a received signal strength indicator (RSSI) is below a predetermined threshold.

For example, the frequency interval may be determined based on a cell search. According to yet another embodiment the processing unit 21 of the secondary network node 12 is arranged thus to determine the at least one frequency interval by performing a cell search to detect at least one free frequency interval. The free frequency interval is substantially free from transmission from an interfering radio access technology (RAT) source 16. The at least one frequency interval may then be determined based on the at least one free frequency interval.

For example, suppose that it is desired to deploy an SCell in the 2.4 GHz ISM frequency band, located between 2.4 and 2.4835 GHz, or in the 5 GHz ISM band, located between 5.15 and 5.725 GHz. In order not to severely degrade the performance of any other communications system currently using this frequency band, a scan (as in step S104) may first be made to determine what other radio access technologies (RATs) are present and also what parts of this frequency band that is occupied.

For example, the SCell 18*a* or the non-cellular RAT hotspot 18*b* may be deployed in the widest available frequency interval. According to one embodiment the processing unit 21 of the secondary network node 12 is thus arranged to, in an optional step S112*a*, configure the secondary network node 12 for transmission in a widest of the at least one frequency interval. There may be different reasons for deploying the SCell 18*a* or the non-cellular RAT hotspot 18*b* in the widest available frequency interval. For example, this may allow for SCell 18*a* or the non-cellular RAT hotspot 18*b* to use a wider bandwidth. For example, even if there are several parts of the frequency band which would allow for the widest bandwidth to be used, it may allow for a larger guard band to other RATs currently operating in the ISM band.

For example, the SCell 18*a* or the non-cellular RAT hotspot 18*b* may be deployed with a carrier frequency centered in an available frequency interval. According to one embodiment the processing unit 21 of the secondary network node 12 is thus arranged to, in an optional step S112*b*, configure the secondary network node 12 for transmission in a bandwidth interval being centered in the one of said at least one frequency interval.

According to a further example, steps S112*a* and S112*b* may be combined, thus resulting in the SCell 18*a* or the non-cellular RAT hotspot 18*b* being deployed with a carrier frequency centered in the widest available frequency interval the secondary network node 12 non-cellular RAT hotspot 18*b* non-cellular RAT hotspot 18*b* non-cellular RAT hotspot 18*b* non-cellular RAT hotspot 18*b* non-cellular RAT hotspot 18*b* non-cellular RAT hotspot 18*b* non-cellular RAT hotspot 18*b* the secondary network node 12 The secondary network node 12 may deploy more than one SCell 18*a* and/or more than one non-cellular RAT hotspot 18*b*. That is, the secondary network node 12 may deploy two or more SCells 18*a* and/or non-cellular RAT hotspot 18*b*. The processing unit 21 of the secondary network node 12 may thus be arranged to, in an optional step, deploy at least one further SCell of the PCell and/or at least one further local area. The at least one further SCell and/or at least one further local area is deployed by configuring the AP for further transmission in the one of the at least one frequency interval or in another of said at least one frequency interval according to further configuration information. That is, the at least one further SCell and/or at least one further local area may be deployed in either the same frequency interval as the SCell 18*a* or non-cellular RAT hotspot 18*b*, or in another frequency interval than the SCell 18*a* or non-cellular RAT hotspot 18*b*.

Once the one or more SCells 18*a* and/or one or more local areas 18*b* have been deployed the secondary network node 12 may start transmitting signals. Thus, according to an embodiment the processing unit 21 of the secondary network node 12 is arranged to, in an optional step S114, transmit signals in the SCell 18*a* or non-cellular RAT hotspot 18*b* according to the configuration information. The transmitted signals may be transmitted using CSMA/CA. There may be different examples of signals for the secondary network node 12 to. Examples of signals transmitted include, but are not limited to: any combination of synchronization signals (such as primary and secondary synchronization signals, PSS/SSS), pilot signals (such as a common reference signal or a dedicated reference signals), beacon signals (such as an LTE beacon signal), and broadcast information signals (such as a master information block and a system information block, MIB/SIB). Such signals may be transmitted if a SCell 18*a* is deployed. Other examples of signals transmitted include, but are not limited to, WLAN beacon signals. Such signals may be transmitted if a non-cellular RAT hotspot 18*b* is deployed.

Further, the secondary network node 12 may detect interference from transmitting interferers 16 in the one of the at least one frequency interval. According to an embodiment the processing unit 21 of the secondary network node 12 is thus arranged to, in an optional step S115*a*, detect transmission of interference from transmitting interferers 16 in the one of the at least one frequency interval. There may be different ways of handling such situations. For example, the secondary network node 12 may, in an optional step S115*b*, terminate transmission of the signals (as transmitted in step S114). The secondary network node 12 may then, in an optional step S115*c*, transmit an indication thereof to the cellular primary network node 13. The cellular primary network node 13 is thereby made aware of an interferer 16 being present in the frequency interval used by the SCell 18*a* or the non-cellular RAT hotspot 18*b*. The cellular primary network node 13 may then take appropriate actions. One such action may involve reconfiguration of the secondary network node 12 similar to step S122, see below.

The secondary network node 12 may continue to scan, for example upon order for the cellular primary network node 13, for other activities in the unlicensed frequency band. For example, the cellular primary network node 13 may instruct the secondary network node 12 to continue the scanning, and report if a better SCell setup or local area setup may be possible. According to an embodiment the processing unit 21 of the secondary network node 12 is thus arranged to, in an optional step S116, scan the at least one unlicensed frequency band for further frequency intervals substantially free from the transmitting interferers 16. This could provide an indication that some new network activities (by other RATs in the unlicensed frequency band) start or that some of the ongoing network activities stop operation.

For example, the secondary network node 12 may report to the cellular primary network node 13 a need for reconfiguration (for example to change the bandwidth, carrier frequency, or RAT used, such as changing from deploying an SCell 18*a* to a non-cellular RAT hotspot 18*b*, or vice versa). At least one further frequency interval free from the transmitting interferers may be detected. According to an embodiment the processing unit 21 of the secondary network node 12 is arranged to, in an optional step S118, transmit further information about the at least one further frequency interval to the cellular primary network node 13. The cellular primary network node 13 may then determine reconfiguration confirmation about the at least one further frequency interval and transmit this reconfiguration confirmation to the secondary network node 12. According to this embodiment the processing unit 21 of the secondary network node 12 is thus arranged to, in an optional step S120, receive reconfiguration confirmation from the cellular primary network node 13. The secondary network node 12 may then, in an optional step S122, be reconfigured for transmission in one of the at least one further frequency interval according to the reconfiguration information.

There may be different ways to perform the reconfiguration in step S122. For example, the processing unit 21 of the secondary network node 12 may be arranged to, in an optional step, terminate transmission of the signals (for example as transmitted in step S114) in the SCell 18*a* or the non-cellular RAT hotspot in, as transmitted according to the second configuration information. The secondary network node 12 may then, in an optional step, be reconfigured to transmit the signals in one of the at least one further frequency interval. The secondary network node 12 may then, in an optional step, transmit the signals in the SCell 18a or the non-cellular RAT hotspot 18b according to the reconfiguration information.

There may be different ways to determine if the secondary network node 12 is to be reconfigured. Examples include, but are not limited to, situations where the at least one further frequency interval free from the transmitting interferers 16 has better adjacent channel leakage ratio (ACLR) properties, adjacent channel selectivity (ACS) properties, bandwidth properties, and/or throughput than the one of the at least one frequency interval.

After having received information of the at least one frequency interval (as in step S206), the network node 13 may compare the bandwidth which can be used by the SCell 18a or the non-cellular RAT hotspot 18b without interfering with RATs of other communications systems with a threshold so as to determine to run the SCell 18a or the non-cellular RAT hotspot 18b in the unlicensed band only if the available bandwidth is larger than this threshold. For example, suppose that the SCell 18a or the non-cellular RAT hotspot 18b is enabled to use a bandwidth of either 1.4 MHz, 5 MHz, 10 MHz, or 20 MHz. It may have been determined that at least 10 MHz is needed for the deployed SCell 18a or the non-cellular RAT hotspot 18b. Thus if the scan in S104 indicates that only 8 MHz is available and such information is received by the network node in step S206, it is then by the network node 13 determined to not run the SCell 18a or the non-cellular RAT hotspot 18b. On the other hand, if the threshold would be such that the SCell 18a or the non-cellular RAT hotspot 18b should be run if at least 5 MHz is available, it may by network node 13 be determined for the SCell 18a or the non-cellular RAT hotspot 18b to start operating in the frequency band, and hence to transmit corresponding configuration information to the secondary network node 12 in step S210.

The cellular primary network node 13 may configures connected devices 19 with information of the SCell 18a or the non-cellular RAT hotspot 18b in order for the connected devices 19 to be able to utilize carrier aggregation with the SCell 18a or connect to the non-cellular RAT hotspot 18b. According to an embodiment the processing unit 26 of the cellular primary network node 13 is thus arranged to, in an optional step S212, configure wireless devices 19 operatively connected to the cellular primary network node 13 according to the configuration information. The configuration information transmitted to the wireless devices 19 may be the same as the configuration information transmitted to the secondary network node 12 in step S210, a proper subset of this configuration information, or may be information that is associated with the this configuration information. For example, the cellular primary network node 13 may informs/order a subset of the wireless devices to do a handover to the secondary network node 12. The subset may e.g., include wireless devices with favorable signal strength towards the secondary network node 12 (in view of the signal strength towards the cellular primary network node 13).

FIG. 7 schematically illustrates one example of frequency allocation in an unlicensed frequency band. The unlicensed frequency band in FIG. 7 is occupied by a first RAT (denoted RAT-1) operating in a bandwidth BW-A, by a second RAT (denoted RAT-2) operating in a bandwidth BW-C, and by a third RAT (denoted RAT-3) operating in a bandwidth BW-E. The bandwidths BW-B and BW-D are free of use. Two or more of RAT-1, RAT-2 and RAT-3 may be the same RAT but operating in different frequency intervals.

Figure 8:
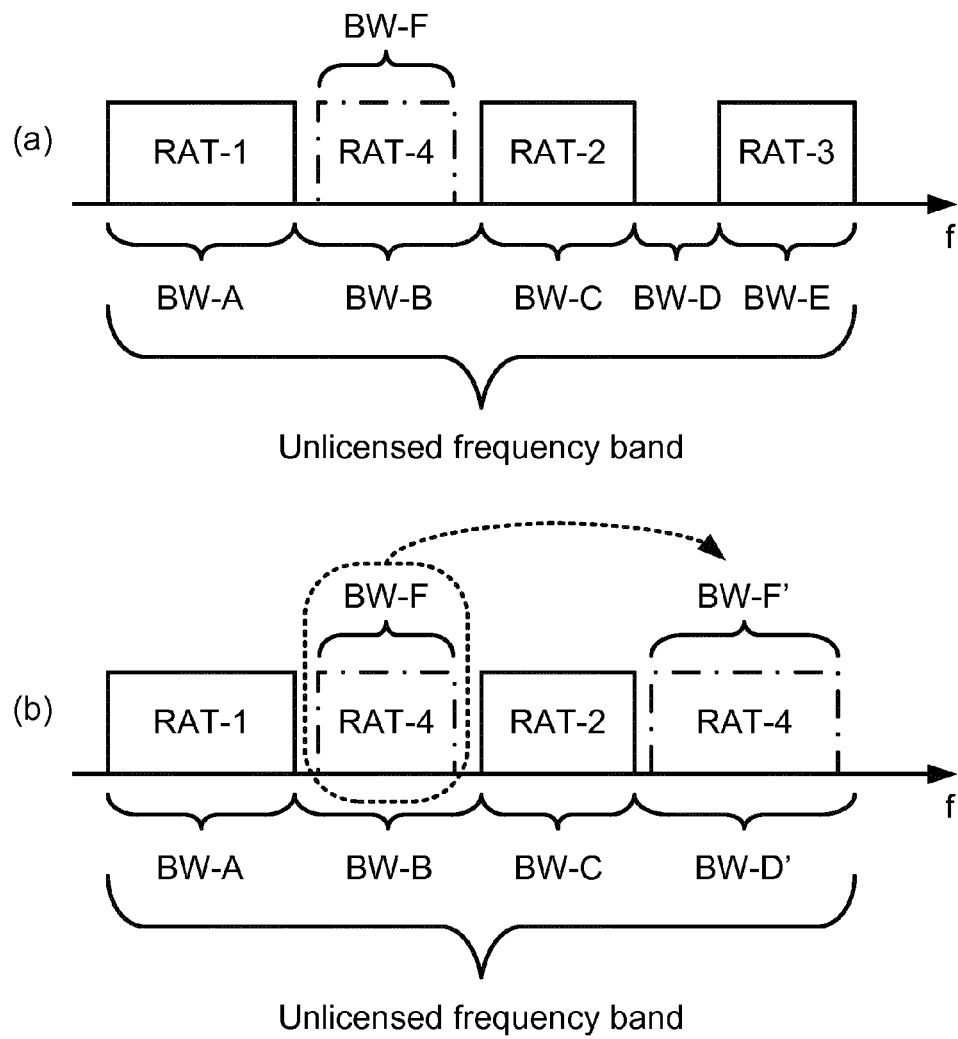

FIG. 8(*a*) schematically illustrates one example of frequency allocation in an unlicensed frequency band similar to that of FIG. 7. In comparison to FIG. 7, a fourth RAT (denoted RAT-4) now occupies a bandwidth BW-F which is part of BW-B. RAT-4 represents the bandwidth of the deployed SCell 18a or the deployed non-cellular RAT hotspot 18b.

FIG. 8(*b*) schematically illustrates one example of frequency allocation in an unlicensed frequency band similar to that of FIG. 8(*a*). In comparison to FIG. 8(*a*), RAT-3 has terminated it transmission and reception in BW-E, thus expanding BW-D to BW-D', allowing RAT-4 to be moved from the bandwidth interval BW-B to the bandwidth interval BW-D' and to occupy a bandwidth BW-F', where BWF' is wider than BW-F. Moving RAT-4 from the bandwidth interval BW-B to the bandwidth interval BW-D' may involve the secondary network node 12 changing from deploying an SCell 18a to deploying a non-cellular RAT hotspot in, or vice versa. Hence the actual RAT used by the secondary network node 12 in the bandwidth interval BW-B may be either the same as or different from the actual RAT used by the secondary network node 12 in the bandwidth interval BW-D'.

Figure 9:
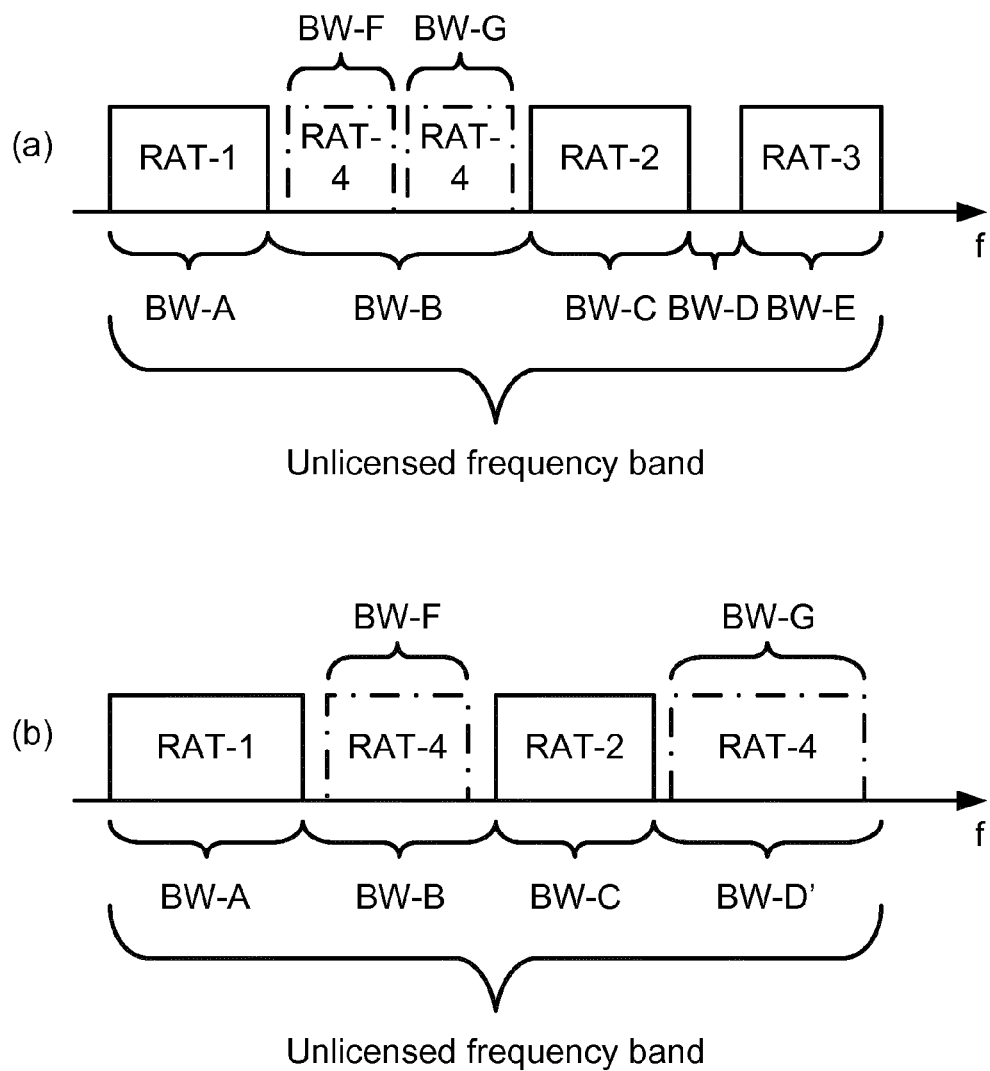

FIGS. 9(*a*) and 9(*b*) schematically illustrate two further examples of frequency allocation in an unlicensed frequency band similar to that of FIG. 8(*a*). In FIG. 9(*a*) RAT-4 occupies a first part (denoted BW-F) and a second part (denoted BW-G) of the bandwidth interval BW-B, thus enabling the secondary network node 12 to deploy a first SCell 18a or a first non-cellular RAT hotspot 18b using BW-F and a second SCell or a second local area using BW-G. In FIG. 9(*b*) RAT-4 also occupies a BW-F and BW-G for deploying a first SCell 18a or a first non-cellular RAT hotspot in, and a second SCell or a second local area, respectively, but in comparison to FIG. 9(*a*) BW-F and BW-G are located in disjoint frequency intervals (BW-B and BW-D', respectively). The secondary network node 12 may thus be arranged to deploy two SCells, two local areas, or one SCell 18a and one non-cellular RAT hotspot 18b.

Two particular embodiments of configuration of a secondary network node 12 will now be disclosed. Both particular embodiments assume that a PCell is operating in a licensed band and a need for CA (enabling and configuration) of an SCell 18a or a non-cellular RAT hotspot 18b in an unlicensed band is needed.

The first particular embodiment relates to operations of the cellular primary network node 13.

The cellular primary network node 13 determines a need for configuration of the secondary network node 12 (as in step S202). The cellular primary network node 13 orders frequency scanning be performed by the secondary network node 12 (as in step S204). The scanning parameters may be proposed carrier frequency and proposed system bandwidth. The scanning parameters may further comprise auxiliary parameters, such as the type of adjacent (or co-channel) interferers (such as another SCell, or local area, etc.), distance (in frequency) to the closest adjacent interferer 16, and/or adjacent/co-channel interference level. Based on configuration information as received from the secondary network node 12 (as in step S206) the cellular primary network node 13 determines either to configure an SCell 18a, a non-cellular RAT hotspot 18b, or no configuration at all (as in step S208). The configuration information may include available free BW, carrier frequency, detected adjacent channel RATs and BWs, signal levels for adjacent channel RAT etc. If no configuration, the cellular primary network node 13 may inform the secondary network node 12 to continue the scanning. The cellular primary network node 13 determines whether to configure an SCell 18a or a non-cellular RAT hotspot 18b based on the available BW and interference situation, possible also including information about the current load and service situation for connected devices to the PCell 17. If there is a decision to configure an SCell or a non-cellular RAT hotspot 18b the cellular primary network node 13 informs the secondary network node 12 with determined parameters defining configuration information (as in step S210). Depending on the RAT determined (i.e., to deploy an SCell 18a or a non-cellular RAT hotspot 18b) the configuration parameters may be different (such as system BW, carrier frequency, transmission power, timing information, etc.). The cellular primary network node 13 also configures connected devices for SCell carrier aggregation (as in step S212). For example, depending on the configuration determined the cellular primary network node 13 either configure SCell parameters to (a first subset) of the connected wireless devices 19, or orders a handover to the local area to (a second subset) of the connected wireless devices 20.

The second particular embodiment relates to operations of the secondary network node 12.

The secondary network node 12 receives a scanning order from the cellular network node 12 to scan an unlicensed frequency band (as in step S102). The secondary network node 12 scans an unlicensed frequency band or bands (as in step S104). The scanning may involve determining the best suitable carrier and possible free bandwidth. Also investigation of what kind of RATs occupying adjacent carriers may be determined (as in step S104a). The secondary network node 12 reports the free frequency information parameters to the cellular primary network node 13 (as in step S108). The secondary network node 12 determines information (as in step S106), which may comprise the best suitable carrier frequency (or radio channel number) and system bandwidth, and reports this to the cellular network node (as in step S108). The secondary network node 12 then receives configuration information (as in step S110) to use by the secondary network node 12, and configures the AP to operate (as in step S112). The secondary network node 12 thus starts act according to the determined configuration (e.g., starts transmitting WLAN beacons, or necessary signals in case of acting as a LTE SCell).

In summary, the herein disclosed embodiments provide mechanisms for a cellular primary network node 13 to control and configure a secondary network node 12 operating in an unlicensed frequency band to operate either as an independent AP for a non-cellular RAT hotspot 18b or as an AP for an SCell 18a associated with a PCell 17. The choice of whether to configure the secondary network node 12 to deploy an SCell 18a or a non-cellular RAT hotspot 18b may depend on properties such as the available free spectrum in the unlicensed frequency band and the load and service needed for devices operatively connected to the PCell 17. The herein disclosed embodiments thus provide mechanisms for optimized usage of an unlicensed band in situation a cellular primary network node 13 is controlling a secondary network node 12 arranged for operating in the unlicensed frequency band. Depending on, for example, the current load in the cellular system as well as, for example, the available spectrum in the unlicensed frequency band, the cellular primary network node 13 may configure the secondary network node 12 to operate as an LTE SCell or as a WLAN AP for optimal capacity and service usage.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for configuration of a secondary network node in a carrier aggregation enabled communications network, the secondary network node supporting radio transmission using a cellular radio access technology (RAT) for deployment as a network node serving a secondary serving cell associated with a primary serving cell in a carrier aggregation enabled communications network using said cellular RAT and a non-cellular RAT for deployment as a network node serving a non-cellular RAT hotspot using said non-cellular RAT, the method being performed by the secondary network node and comprising the steps of:
    receiving an indication from a cellular primary network node associated with the primary serving cell to start scanning an unlicensed frequency band for deployment of said network node serving the secondary serving cell or as said network node serving the non-cellular RAT hotspot, wherein the non-cellular RAT hotspot is an independent access point that provides non-cellular access to the Internet;
    scanning at least one unlicensed frequency band to determine whether or not interference from transmitting interferers is present in the at least one unlicensed frequency band;
    determining, based on said scanning, at least one frequency interval of said at least one unlicensed frequency band substantially free from said transmitting interferers;
    transmitting information of said at least one frequency interval to said cellular primary network node;
    receiving configuration information from said cellular primary network node, said configuration information having one of at least two states and indicating how to deploy said secondary network node including a first state indicating that said secondary network node should be deployed as the network node serving the secondary serving cell associated with the primary serving cell in the carrier aggregation enabled communications network using said cellular RAT, and a second state indicating that said secondary network node should be deployed as the network node serving the non-cellular RAT hotspot using said non-cellular RAT; and
    deploying said network node using the cellular RAT or the non-cellular RAT by configuring the secondary network node for transmission in one of said at least one frequency interval according to said configuration information.

2. The method according to claim 1, wherein the cellular RAT is a Long Term Evolution (LTE) compliant RAT, and wherein the non-cellular RAT is a Wireless Local Area Network (WLAN) compliant RAT and/or an IEEE 802.11 compliant RAT.

3. The method according to claim 1, wherein said scanning comprises:
    determining what RATs are occupying carriers adjacent to said at least one frequency interval.

4. The method according to claim 1, wherein configuring the secondary network node comprises:
    configuring the secondary network node for transmission in a widest of said at least one frequency interval.

5. The method according to claim 1, wherein configuring the secondary network node comprises:

configuring the secondary network node for transmission in a bandwidth interval being centered in said one of said at least one frequency interval.

6. The method according to claim 1, further comprising:
determining said one of said at least one frequency interval based on at least one of adjacent channel leakage ratio (ACLR) requirements, adjacent channel selectivity (ACS) requirements, bandwidth requirements, and throughput requirements for the secondary serving cell or the non-cellular RAT hotspot.

7. The method according to claim 1, wherein said configuration information further comprises at least one of: bandwidth configuration information, carrier frequency configuration information, radio channel number information, and transmission power configuration information.

8. The method according claim 1, further comprising:
transmitting signals in the secondary serving cell or the non-cellular RAT hotspot according to said configuration information.

9. The method according to claim 8, wherein said transmitted signals are any combination of synchronization signals, such as primary and secondary synchronization signals, pilot signals, such as a common or dedicated reference signal, beacon signals and broadcast information signals, such as a master information block and a system information block.

10. The method according to claim 8, wherein said transmitted signals are wireless local area network (WLAN) beacon signals.

11. The method according to claim 8, wherein said transmitted signals are transmitted using carrier sense multiple access with collision avoidance (CSMA/CA).

12. The method according to claim 1, wherein said scanning comprises at least one of: performing a power scan in said at least one unlicensed frequency band, and performing a cell search in said at least one unlicensed frequency band.

13. The method according to claim 1, further comprising:
scanning said at least one unlicensed frequency band for further frequency intervals substantially free from said transmitting interferers.

14. The method according to claim 13, further comprising, if at least one further frequency interval free from said transmitting interferers has been detected:
transmitting further information about said at least one further frequency interval to said cellular primary network node;
receiving reconfiguration confirmation from said cellular primary network node; and
reconfiguring the secondary network node for transmission in one of said at least one further frequency interval according to said reconfiguration information.

15. The method according to claim 1, wherein said at least one unlicensed frequency band is at least one of a 2.4 GHz frequency band, a 5 GHz frequency band, a 900 MHz frequency band, a 24 GHz frequency band, and a 60 GHz frequency band.

16. The method according to claim 8, further comprising:
detecting transmission of interference from transmitting interferers in said one of said at least one frequency interval;
terminating transmission of said signals; and
transmitting an indication thereof to said cellular primary network node.

17. The method according to claim 1, wherein the secondary network node is a Node B or an Evolved Node B.

18. A method for configuration of a secondary network node in a carrier aggregation enabled communications network, the secondary network node supporting radio transmission using a cellular radio access technology (RAT) for deployment as a network node serving a secondary serving cell associated with a primary serving cell in a carrier aggregation enabled communications network using said cellular RAT and a non-cellular RAT for deployment as a network node serving a non-cellular RAT hotspot using said non-cellular RAT, the method being performed by a cellular primary network node associated with the primary serving cell and comprising the steps of:
determining a need for configuration of the secondary network node for the secondary serving cell or the non-cellular RAT hotspot in an unlicensed frequency band;
transmitting an indication for the secondary network node to start scanning said unlicensed frequency band for deployment of said network node serving the secondary serving cell or said network node serving the non-cellular RAT hotspot, wherein the non-cellular RAT hotspot is an independent access point that provides non-cellular access to the Internet;
receiving, from the secondary network node, information of at least one frequency interval of said at least one unlicensed frequency band substantially free from transmitting interferers;
determining, based on said received information, configuration information for configuring the secondary network node for transmission in one of said at least one frequency interval using the cellular RAT or the non-cellular RAT, wherein the configuration information has one of at least two states and indicates how to deploy said secondary node, including a first state indicating that said secondary network node should be deployed as the network node serving the secondary serving cell associated with the primary serving cell in the carrier aggregation enabled communications network using said cellular RAT, and a second state indicating that said secondary network node should be deployed as the network node serving the non-cellular RAT hotspot using said non-cellular RAT; and
transmitting said configuration information to the secondary network node.

19. The method according to claim 18, further comprising:
configuring devices operatively connected to the cellular primary network node according to said configuration information.

20. The method according to claim 18, wherein said configuration information is based on a current cell load of said cellular primary network node.

21. The method according to claim 18, wherein said configuration information is based on at least one of service requirements, quality of service requirements, and throughput requirements of devices operatively connected to said cellular primary network node.

22. The method according to claim 18, wherein said configuration information is based on a bandwidth of said at least one frequency interval.

23. A secondary network node for configuration of the secondary network node in a carrier aggregation enabled communications network, the secondary network node being arranged to support radio transmission using a cellular radio access technology (RAT) for deployment of as a network node serving secondary serving cell associated with a primary serving cell in a carrier aggregation enabled communications network using said cellular RAT and a non-cellular RAT for deployment as a network node serving a non-cellular RAT hotspot using said non-cellular RAT, the secondary network node comprising a processing unit arranged to:
  receive an indication from a cellular primary network node associated with the primary serving cell to start scanning an unlicensed frequency band for deployment of said network node serving the secondary serving cell or as said network node serving the non-cellular RAT hotspot, wherein the non-cellular RAT hotspot is an independent access point that provides non-cellular access to the Internet;
  scan at least one unlicensed frequency band to determine whether or not interference from transmitting interferers is present in the at least one unlicensed frequency band;
  determine, based on said scanning, at least one frequency interval of said at least one unlicensed frequency band substantially free from said transmitting interferers;
  transmit information of said at least one frequency interval to said cellular primary network node;
  receive configuration information from said cellular primary network node, said configuration information having one of at least two states and indicating how to deploy said secondary network node including a first state indicating that said secondary network node should be deployed as the network node serving the secondary serving cell associated with the primary serving cell in the carrier aggregation enabled communications network using said cellular RAT, and a second state indicating that said secondary network node should be deployed as the network node serving the non-cellular RAT hotspot using said non-cellular RAT; and
  deploy said network node using the cellular RAT or the non-cellular RAT by configuring the secondary network node for transmission in one of said at least one frequency interval according to said configuration information.

24. A cellular primary network node for configuration of a secondary network node in a carrier aggregation enabled communications network, the secondary network node being arranged to support radio transmission using a cellular radio access technology (RAT) for deployment as a network node serving a secondary serving cell associated with a primary serving cell in a carrier aggregation enabled communications network using said cellular RAT and a non-cellular RAT for deployment as a network node serving a non-cellular RAT hotspot using said non-cellular RAT, and the cellular primary network node comprising a processing unit arranged to:
  determine a need for configuration of the secondary network node for the secondary serving cell or the non-cellular RAT hotspot in an unlicensed frequency band;
  transmitting an indication for the secondary network node to start scanning said unlicensed frequency band for deployment of said network node serving the secondary serving cell or said network node serving the non-cellular RAT hotspot, wherein the non-cellular RAT hotspot is an independent access point that provides non-cellular access to the Internet;
  receive, from the AP, information of at least one frequency interval of said at least one unlicensed frequency band substantially free from transmitting interferers;
  determine, based on said received information, configuration information for configuring the secondary network node for transmission in one of said at least one frequency interval using the cellular RAT or the non-cellular RAT, wherein the configuration information has one of at least two states and indicates how to deploy said secondary node, including a first state indicating that said secondary network node should be deployed as the network node serving the secondary serving cell associated with the primary serving cell in the carrier aggregation enabled communications network using said cellular RAT, and a second state indicating that said secondary network node should be deployed as the network node serving the non-cellular RAT hotspot using said non-cellular RAT; and
  transmit said configuration information to the secondary network node.

25. An arrangement comprising:
  a secondary network node according to claim 24; and
  the cellular primary network node, arranged to support radio transmission using a cellular RAT for deployment as the network node serving the secondary serving cell associated with the primary serving cell in the carrier aggregation enabled communications network using said cellular RAT and the non-cellular RAT for deployment as the network node serving the non-cellular RAT hotspot using said non-cellular RAT.

26. The arrangement according to claim 25, wherein the secondary network node is part of the cellular primary network node.

27. A nontransitory computer readable storage medium comprising a computer program for configuration of a secondary network node in a carrier aggregation enabled communications network, the secondary network node being arranged to support radio transmission using a cellular radio access technology (RAT) for deployment of as a network node serving secondary serving cell associated with a primary serving cell in a carrier aggregation enabled communications network using said cellular RAT and a non-cellular RAT for deployment as a network node serving a non-cellular RAT hotspot using said non-cellular RAT, the computer program comprising computer program code which, when run on the secondary network node causes the secondary network node to:
  receive an indication from a cellular primary network node associated with the primary serving cell to start scanning an unlicensed frequency band for deployment of said network node serving the secondary serving cell or as said network node serving the non-cellular RAT hotspot, wherein the non-cellular RAT hotspot is an independent access point that provides non-cellular access to the Internet;
  scan at least one unlicensed frequency band to determine whether or not interference from transmitting interferers is present in the at least one unlicensed frequency band;
  determine, based on said scanning, at least one frequency interval of said at least one unlicensed frequency band substantially free from said transmitting interferers;
  transmit information of said at least one frequency interval to said cellular primary network node;
  receive configuration information from said cellular primary network node, said configuration information having one of at least two states and indicating how to deploy said secondary network node including a first state indicating that said secondary network node should be deployed as the network node serving the secondary serving cell associated with the primary serving cell in the carrier aggregation enabled communications network using said cellular RAT, and a second state indicating that said secondary network node should be deployed as the network node serving the non-cellular RAT hotspot using said non-cellular RAT; and deploy said network node using the cellular RAT or the non-cellular RAT by configuring the secondary network node for transmission in one of said at least one frequency interval according to said configuration information.

28. A nontransitory computer readable storage medium comprising a computer program for configuration of a secondary network node in a carrier aggregation enabled communications network, the secondary network node being arranged to support radio transmission using a cellular radio access technology (RAT) for deployment as a network node serving a secondary serving cell associated with a primary serving cell in a carrier aggregation enabled communications network using said cellular RAT and a non-cellular RAT for deployment as a network node serving a non-cellular RAT hotspot using said non-cellular RAT, the computer program comprising computer program code which, when run on a cellular primary network node being arranged to be associated with the primary serving cell, causes the cellular primary network node to:

determine a need for configuration of the secondary network node for the secondary serving cell or the non-cellular RAT hotspot in an unlicensed frequency band;

transmitting an indication for the secondary network node to start scanning said unlicensed frequency band for deployment of said network node serving the secondary serving cell or said network node serving the non-cellular RAT hotspot, wherein the non-cellular RAT hotspot is an independent access point that provides non-cellular access to the Internet;

receive, from the AP, information of at least one frequency interval of said at least one unlicensed frequency band substantially free from transmitting interferers;

determine, based on said received information, configuration information for configuring the secondary network node for transmission in one of said at least one frequency interval using the cellular RAT or the non-cellular RAT, wherein the configuration information has one of at least two states and indicates how to deploy said secondary node, including a first state indicating that said secondary network node should be deployed as the network node serving the secondary serving cell associated with the primary serving cell in the carrier aggregation enabled communications network using said cellular RAT, and a second state indicating that said secondary network node should be deployed as the network node serving the non-cellular RAT hotspot using said non-cellular RAT; and transmit said configuration information to the secondary network node.

* * * * *